United States Patent

Dietz

[11] 4,037,137
[45] July 19, 1977

[54] CENTERING CIRCUIT FOR A TELEVISION DEFLECTION SYSTEM

[75] Inventor: Wolfgang Friedrich Wilhelm Dietz, New Hope, Pa.

[73] Assignee: RCA Corporation, New York, N.Y.

[21] Appl. No.: 553,400

[22] Filed: Feb. 26, 1975

[51] Int. Cl.² ............................................. H01J 29/54
[52] U.S. Cl. .................................... 315/398; 315/408
[58] Field of Search ................. 315/398, 399, 407, 408

[56] References Cited

U.S. PATENT DOCUMENTS

| | | | |
|---|---|---|---|
| 2,935,644 | 5/1960 | Leeds | 315/398 |
| 3,489,948 | 1/1970 | Buechel | 315/398 |
| 3,733,513 | 5/1973 | Yoshikawa et al. | 315/398 |
| 3,814,981 | 11/1976 | Rusk | 315/398 |

Primary Examiner—Maynard R. Wilbur
Assistant Examiner—T. M. Blum
Attorney, Agent, or Firm—E. M. Whitacre; Paul J. Rasmussen

[57] ABSTRACT

A centering circuit comprising a non-symmetrical conduction network and an integrating inductor in series combination is coupled to a deflection system between the junction of the S-shaping capacitor and the deflection windings and the junction of a winding of the high voltage transformer and its associated coupling capacitor, these junction points providing a relatively small but adequate voltage difference to energize the centering circuit with minimum deflection system power dissipation. The non-symmetrical conduction network comprises two oppositely poled diodes and a potentiometer. The adjustment of the potentiometer provides for a change of the magnitude and polarity of the average current flowing through the deflection winding during the trace interval.

6 Claims, 4 Drawing Figures

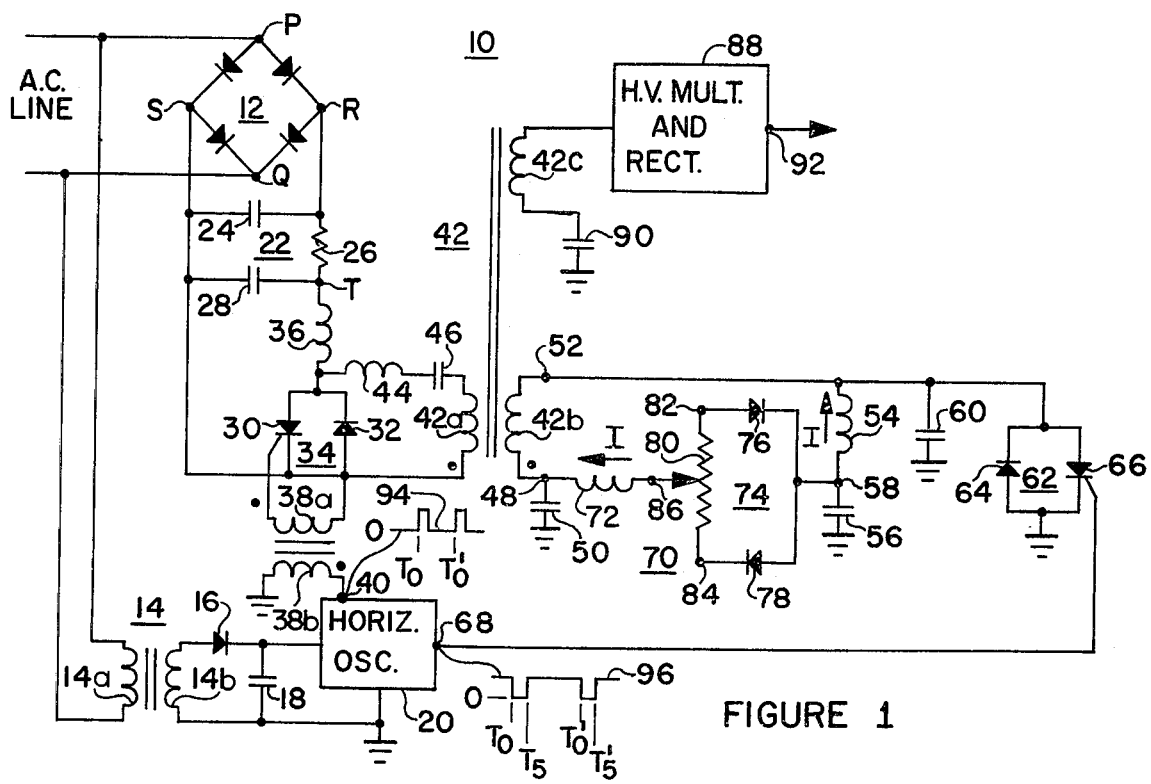
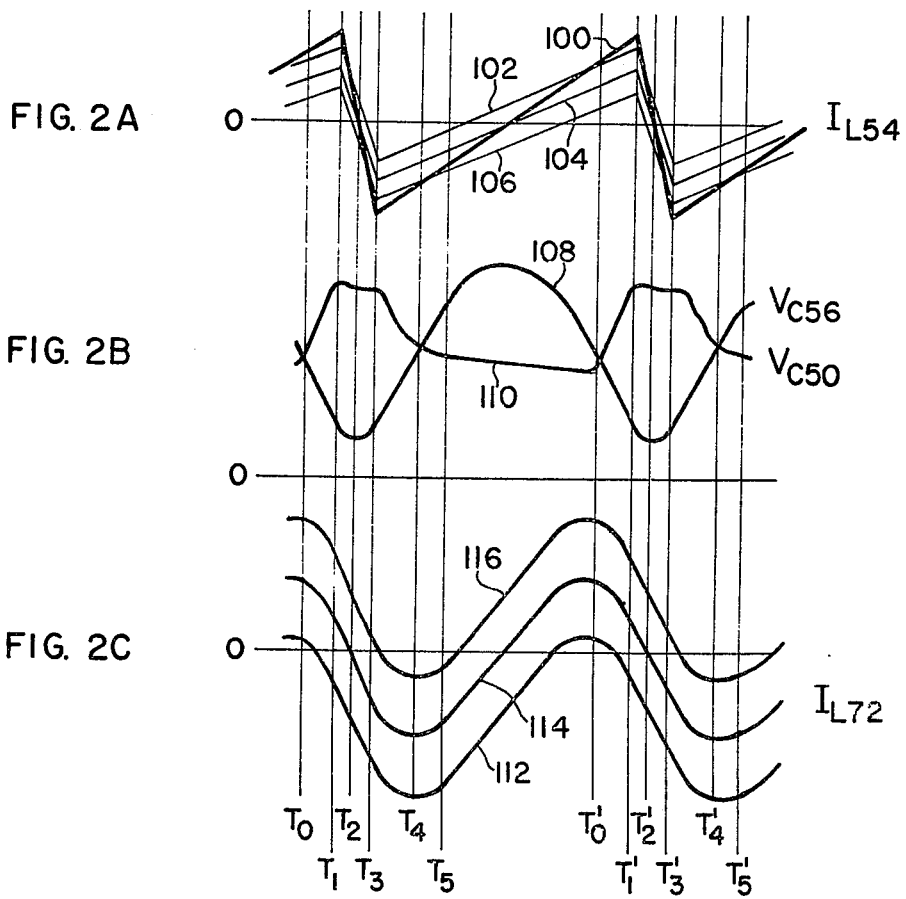

CENTERING CIRCUIT FOR A TELEVISION DEFLECTION SYSTEM

BACKGROUND OF THE INVENTION

The invention relates to a centering circuit for a television deflection system.

Deflection systems utilized in television receivers frequently include circuitry which allows for the adjustment of the centering of the raster on the face of the kinescope tube. The need for this centering feature is increased as overscan of the kinescope tube is reduced, that is, as the raster width approaches the width of the kinescope tube face. Centering is usually accomplished by causing a direct current of selected polarity and amplitude to flow through the deflection coils.

The more efficient prior art arrangements utilize centering circuitry placed in parallel with the deflection windings to produce an average current through the deflection winding during the trace interval. This centering circuitry includes a non-symmetrical conduction network including an adjustable resistor and an integrating inductor in series combination for rectifying some of the scanning current. The nominal resistance of the adjustable resistor and the impedance of the integrating inductor in this arrangement must be relatively large as compared to the impedance of the deflection winding since the same voltage exists across the centering circuit that exists across the deflection winding and only a small fraction of the current through the deflection is conducted through the centering circuit. Hence there is a relatively large amount of power dissipated in the centering circuit.

SUMMARY OF THE INVENTION

A deflection system including a centering circuit comprises a first series combination comprising a transformer winding and a first capacitor and a second series combination comprising a deflection winding and a second capacitor. Means coupled to the first and the second series combinations supply energy to the first and the second series combination during a first time interval of a deflection cycle and provide an efficient path for current flow between the first capacitor and the transformer winding and between the second capacitor and the deflection winding during a second time interval of the deflection cycle. A centering means coupled to the junction of the transformer winding and the first capacitor and the junction of the deflection winding and the second capacitor provides for a predetermined polarity and magnitude of average current flow through the deflection winding during the deflection cycle.

A more detailed description of a preferred embodiment of the invention is given in the following detailed description and accompanying drawings of which:

FIG. 1 is a schematic diagram, partially in block form, of a deflection system embodying the invention; and FIG. 2A–C are normalized waveforms obtained at various points in the schematic diagram of FIG. 1.

DESCRIPTION OF THE INVENTION

FIG. 1 is a schematic diagram, partially in block form, of a deflection system 10 embodying the invention. A source of alternating current voltage (not shown) is coupled to terminals P and Q of a bridge rectifier 12 and to a primary winding 14a of a transformer 14. A secondary winding 14b of transformer 14 is coupled through a diode 16 to a filter capacitor 18 and to a horizontal oscillator 20 thereby providing a low level direct current operating potential to the horizontal oscillator 20 when winding 14a is energized. With operating potential applied to horizontal oscillator 20 signals are developed at terminals 40 and 68 as shown in waveforms 94 and 96 respectively.

Terminals R and S of bridge rectifier 12 are coupled to a filter network 22 which comprises a capacitor 24, a resistor 26, and a capacitor 28. A source of medium level direct current operating potential (B+) is therefore provided at a terminal T relative to the terminal S when terminals P and Q of bridge rectifier 12 is energized.

A silicon controlled rectifier (SCR) 30 and a damper diode 32 are coupled in anti-parallel combination to form a commutating switch 34. The anode electrode of SCR 30 is coupled by means of input reactor 36 to terminal T, and the cathode electrode of SCR 30 is coupled to terminal S. The gate electrode of SCR 30 is coupled to a winding 38a of a transformer 38. The other terminal of winding 38a is coupled to terminal S. Winding 38b, polarized with respect to winding 38a as shown by the polarizing dots, is coupled between a terminal 40 of the horizontal oscillator 20 and reference potential.

A winding 42a of a high voltage transformer 42 is coupled in parallel with the commutating switch 34 by means of a series combination of a commutating coil 44 and a commutating capacitor 46. A winding 42b of transformer 42, polarized with respect to winding 42a as shown by polarizing dots, has a first terminal 48 coupled by means of a capacitor 50 to reference potential. A second terminal 52 of winding 42b is coupled by means of a series combination of deflection winding 54 and an S-shaping capacitor 56 to reference potential. The junction of deflection winding 54 and S-shaping capacitor 56 forms a terminal 58. The capacitor 50 is required to allow an average direct current potential to be maintained on capacitor 56 to accomplish the desired S-shaping of the deflection current waveform through deflection winding 54.

Terminal 52 of winding 42b is also coupled by means of a parallel combination of a retrace capacitor 60 and a trace switch 62 to reference potential. The trace switch comprises a damper diode 64 and an SCR 66 in anti-parallel combination with the cathode electrode of SCR 66 coupled to reference potential. The gate electrode of SCR 66 is coupled to terminal 68 of the horizontal oscillator 20.

The terminal 48 is coupled to the terminal 58 by means of a centering circuit 70 comprising an integrating inductor 72 and a non-symmetrical conduction network 74 in series combination. The non-symmetrical conduction network 74 comprises a diode 76, a diode 78, and a potentiometer 80. The cathode electrode of diode 76 and the anode electrode of diode 78 are coupled to terminal 58. The anode of diode 76 is coupled to a first fixed terminal 82 of the resistive element of potentiometer 80 and the cathode of diode 78 is coupled to a second fixed terminal 84 of the resistive element of potentiometer 80. A wiper terminal 86 of potentiometer 80 is coupled to the inductor 72. The other terminal of inductor 72 is coupled to terminal 48. The inductor 72 provides for a phase shift of the current through the centering circuit 70 relative to the voltage between terminals 48 and 58, thereby, providing for the desired amplitude and phase of centering current through the deflection winding 54.

One terminal of winding 42c of the high voltage transformer 42 is coupled to a high voltage multiplier and rectifier 88 and the other terminal is coupled to reference potential by means of a capacitor 90. The high voltage multiplier and rectifier 88 processes voltage pulses developed by winding 42c to develop a high voltage direct current potential at output terminal 92 which is coupled to the ultor electrode of a kinescope tube (not shown).

The waveforms shown in FIGS. 2A-C will be utilized in the explanation of the operation of the deflection system 10. It will be assumed that drive pulses from the horizontal oscillator 20 at terminals 40 and 68, as shown in waveforms 94 and 96 respectively, and B+ have been applied for a number of deflection cycles prior to $T_0$. Also, to simplify the explanation of the operation of the deflection system the operation of the deflection system will be considered first without the centering circuit 70 coupled between terminals 48 and 58. Next, the effect of the centering circuit 70 on the deflection current, that is, the current through the deflection winding 54, will be considered.

At $T_0$ the signal at the output terminal 40 of the horizontal oscillator 20, as shown in waveform 94, makes a transition from a logic 0 to a logic 1 and the signal at the output terminal 68, as shown in waveform 96, makes a transition from a logic 1 to a logic 0. Since the windings of transformer 38 are phased as shown by the polarizing dots the gate electrode of SCR 30 also goes to a logic 1 thereby causing conduction through the SCR 30 which results in the initiation of a commutating interval ($T_0-T_4$) which provides for a retrace interval ($T_1-T_3$). The transition from a logic 1 to a logic 0 on the gate electrode of SCR 66, however, has no effect on the conduction of SCR 66 at $T_0$.

The commutating current which flows through commutating coil 44, SCR 30 and winding 42a from capacitor 46 during the first position of the commutating interval $T_0-T_1$ develops a voltage across winding 42a of transformer 42 which is positive at the polarizing dot and which produces a voltage across windings 42b which is positive at the polarizing dot. The voltage produced by winding 42b produces a current from the junction of deflection winding and winding 42b through capacitor 50 to reference potential in excess of and of the same polarity as the current through the deflection winding 54 at $T_1$ as shown in waveform 100, FIG. 2A, the positive current through the deflection winding 54 being indicated by the arrow adjacent the deflection winding in FIG. 1. Therefore, the SCR 66 which is conductive during the second half of the trace interval and which has a logic 0 on the gate electrode is turned off as a result of the current produced by winding 42b. The excess current produced by winding 42b during this time interval is conducted by diode 64.

At $T_1$ the commutating current produced by capacitor 46 reverses polarity and flows through diode 32, commutating coil 44, and winding 42a. Since prior to $T_1$ the signal at terminal 40 of horizontal oscillator 20 goes to a logic 0, SCR 30 is turned off at $T_1$. The voltage produced across winding 42b is negative at the polarizing dot producing a negative voltage at the polarizing dot of winding 42b, therefore diode 64 is switched off initiating the retrace interval ($T_1-T_3$). During the retrace interval energy stored in capacitor 46 during the previous trace interval is utilized to replenish the losses of the circuitry coupled to winding 42b. Also during the retrace interval, a voltage pulse is developed across winding 42c of high voltage transformer 42 which produces a pulse on winding 42c. The pulse on winding 42c is processed as aforementioned by the high voltage multiplier and rectifier 88 to produce a high voltage direct current potential at output terminal 92. The retrace interval is terminated at $T_3$ when both the SCR 66 and the diode 64 cease conduction.

At $T_3$ current flowing in deflection winding 54 begins to flow through diode 64 and S-shaping capacitor 56 and current flowing in winding 42b begins to flow through diode 64 and capacitor 50. As shown in waveform 100, FIG. 2A, the deflection current at $T_3$ is at a maximum negative amplitude.

At $T_4$ the commutating interval ends and capacitor 46 begins to charge from B+ through input reactor 36, commutating coil 44, and winding 42a in preparation for the next commutating interval. During the trace interval ($T_3-T_1'$) the deflection current decreases in negative amplitude until reaching a zero current at approximately halfway between $T_3$ and $T_1'$.

At $T_5$ the gating signal developed at terminal 68 of horizontal oscillator 20 goes to a logic 1 providing a logic 1 to the gate electrode of SCR 66 thereby providing for conduction of SCR 66 when the anode electrode goes positive. The deflection current, therefore, begins to increase in positive amplitude as a result of the discharge of capacitor 56. At $T_1'$ the next retrace interval ($T_1'-T_2'$) is initiated.

During one deflection cycle ($T-T_0'$) a voltage is developed across the capacitor 56 as shown in waveform 108 of FIG. 2B. Also, a voltage is developed across the capacitor 50 as shown in waveform 110 of FIG. 2B.

By connecting the centering circuit 70 between the terminals 48 and 58 the average current through the deflection winding 54 during the deflection cycle can be controlled to develop a nominal waveform 104 or waveforms within the limits defined by waveforms 102 and 106 as shown in FIG. 2A. It is noted that the average level of these scanning current waveforms is shifted selectively by the centering circuit in a manner to be described hereinafter to shift the raster for providing centering. The current flowing through the inductor 72 during the deflection cycle is nominally as shown in waveform 114 and can be controlled between the limits defined by waveforms 112 and 116 as shown in FIG. 2C. Current through deflection winding 54 and inductor 72 as illustrated in waveforms of FIG. 2A and 2C is positive when current is flowing in the direction of the arrows adjacent the deflection winding 54 and inductor 72 of FIG. 1.

The effects of the centering circuit 70 on the deflection circuit will be considered with each of three different positions of the wiper arm of the potentiometer 80: (1) with the wiper arm 86 positioned adjacent the terminal 82 of the resistive element of potentiometer 80; (2) with the wiper arm 86 positioned adjacent the terminal 84 of the resistive element of potentiometer 80; (3) with the wiper arm 86 positioned in approximately the center of the resistive element of potentiometer 80. It will be understood, however, that positioning the wiper arm 86 at positions intermediate to extremes defined by terminals 82 and 84 will provide intermediate average currents through the deflection winding 54.

The waveshape 112 of FIG. 2C indicates the current flow through the inductor 72 during the deflection cycle with the wiper arm 86 positioned adjacent the terminal 82 of potentiometer 80. As can be seen in waveform 112, the maximum positive current flowing through inductor 72 during the deflection cycle is less than the maximum negative current flowing through inductor 72. This difference in current flow through inductor 72 is due to the fact that nearly all of the resistance of potentiometer 80 is in series with the diode 78 and very little of the resistance is in series with diode 76. This lack of symmetry provides for a deflection current waveform 102 and for a corresponding shift of the raster on the kinescope tube face toward the right of the center as explained below.

At $T_0$ as shown in FIG. 2B the voltage at terminal 54 is equal to the voltage at terminal 48 and a maximum positive current flows through inductor 72 as shown in waveform 112, FIG. 2C. During the interval $T_0$-$T_4$ the voltage at terminal 48 is more positive than the voltage at terminal 58 which produces a decrease of the positive current flow through the inductor 72 during this time interval from the level existing at $T_0$ as shown in waveform 112 of FIG. 2C. During the interval $T_2$-$T_3$ a portion of the current flowing from capacitor 50 flows through inductor 72, potentiometer 80, and diode 76. Therefore, the current flowing through the winding 42b and the deflection winding 54 at $T_3$ is less with the centering circuit 70 coupled between terminals 48 and 58 as shown in waveform 102 of FIG. 2A than without the centering circuit as shown in waveform 100. This is based on the assumption that B+ remains constant and that there is a constant load on winding 42c.

At $T_4$ the voltage at terminal 58 equals the voltage at terminal 48 and the current flowing through the inductor 72, as shown in waveform 112, is at a maximum negative magnitude. During the interval $T_4$-$T_0'$ the voltage at terminal 58 is more positive than the voltage at terminal 48 resulting in a decrease of the negative current flow through the inductor 72 during this time interval. This decrease in negative current flow as can be seen is similar to the decrease in negative current flow through the deflection winding 54 during this time interval.

Just prior to $T_1'$ the current in inductor 72 goes positive, which current flows from capacitor 56 to capacitor 50. Therefore, the current flowing through the deflection winding 46 at $T_1'$ is less with the centering circuit 70 coupled between terminals 48 and 58 as shown in waveform 102 of FIG. 2A than without the centering circuit as shown in waveform 100. This is again based on the assumption that B+ remains constant and that there is a constant load on winding 42c. Due to the fact that nearly all the resistance of potentiometer 80 is in series with the diode 78, the maximum positive current flow between terminal 48 and the terminal 58 is less than the maximum negative current flow as shown in waveform 112 of FIG. 2C. Therefore, with the wiper arm 86 positioned adjacent the terminal 82 of the potentiometer 80, current flowing from capacitor 56 through deflection winding 54 and SCR 66 at $T_1'$ is greater than the negative current that flowed through deflection winding 54 from capacitor 50 and at $T_3$. This lack of symmetry provides for a shifting of the raster on the kinescope tube face toward the right of the center.

The waveform 116 of FIG. 2C indicates the current flow through the inductor 72 during the deflection cycle with wiper arm 86 positioned adjacent the terminal 84 of potentiometer 80. As can be seen in waveform 116, the maximum positive current flowing through inductor 72 during the deflection cycle is more than the maximum negative current flowing through inductor 72. This difference in current flow through inductor 72 is due to the fact that nearly all of the resistance of potentiometer 80 is in series with the diode 76 and very little of the resistance is in series with diode 78. This lack of symmetry provides for a deflection current waveform 106 and for a corresponding shift of the raster on the kinescope tube face toward the left of the center as explained below.

The operation of the deflection circuit with the wiper arm 86 positioned adjacent terminal 84 is similar to that explained above with respect to the operation with the wiper arm 86 positioned adjacent terminal 82. However, during the interval $T_2$-$T_3$ a larger portion of the current flowing from capacitor 50 flows through the winding 42b and the deflection winding 54 and a smaller portion flows through inductor 72, potentiometer 80, and diode 76 than with the wiper arm 86 adjacent terminal 82. Therefore, at $T_3$ the current flowing through the deflection winding 54 is as shown in waveform 106 of FIG. 2A rather than as shown in waveform 102 for the wiper arm positioned adjacent terminal 82.

During the interval $T_4$-$T_0'$ the negative current flow through the inductor 72 decreases. The current through inductor 72, as shown in waveform 116, goes positive sooner than as shown in waveform 112. Just after becoming positive the current through inductor 72 flows from deflection winding 54 through the centering circuit 70 to capacitor 50, thereby, reducing the energy transferred from the deflection winding 54 to the capacitor 56 during the trace interval ($T_3$-$T_1'$). Just prior to $T_1'$ the current in the inductor 72 flows from capacitor 56 to capacitor 50 and this current is greater in magnitude than with the wiper arm positioned adjacent terminal 82. Therefore, the current flowing through the deflection winding 54 at $T_1'$ is less with the wiper arm 86 adjacent terminal 84 than with the wiper arm adjacent terminal 82. The lack of symmetry described above provides for a shifting of the raster on the kinescope tube face toward the left of center.

The waveform 114 of FIG. 2C indicates the current flow through the inductor 72 during the deflection cycle with the wiper arm 86 positioned in approximately the center of the resistive element of potentiometer 80. As can be seen in waveform 114, the maximum positive current flowing through inductor 72 is approximately equal to the maximum negative current flow. This symmetry provides for a deflection current waveform 104 and virtually no shift of the raster on the kinescope tube face from that produced by waveform 100.

It will be noted that, in each of the aforementioned descriptions of the operation of the deflection system 10 with the centering circuit 70 coupled between terminal 48 and terminal 58, the voltage required to maintain the production of a uniform deflection current waveform in the deflection winding 54 is supplied by winding 42b. The voltage supplied by winding 42b also provides for an enhancement of the voltage difference between terminal 48 and terminal 58 during the time interval $T_0$-$T_4$ making possible the desired degree of raster shift during this time interval.

Due to the fact that the maximum voltage differential between terminals 48 and 58 is very much less than the maximum voltage across the deflection winding 54, the resistance of the resistive element of potentiometer 80 and the inductance of the inductor 72 are proportionally smaller for the same maximum raster shift than when the centering circuit is placed in parallel with the deflection windings 54. The inductance value of inductor 72 being less than in a similar centering circuit coupled in parallel with the deflection winding provides for lower overall cost of providing a given degree of raster shifting capability. Also the resistance value of the resistive element of the potentiometer being less than in a similar centering circuit coupled in parallel with the deflection winding provides for less power dissipation in the centering circuit for a given raster shift.

What is claimed is:

1. A deflection system including a centering circuit, comprising:
   a first series combination comprising a transformer winding and a first capacitor and having a first junction therebetween;
   a second series combination comprising a deflection winding and a second capacitor and having a second junction therebetween;
   means coupled to said first and second series combinations for supplying energy to said first and second series combinations during a first time interval of a deflection cycle and for providing an efficient path for current flow between said first capacitor and said transformer winding and between said second capacitor and said deflection winding during a second time interval of said deflection cycle for developing a first alternating current voltage at said first junction and a second alternating current voltage at said second junction, said first and second voltages being substantially of opposite phase; and
   centering means including unilateral conducting means coupled to said first junction and to said second junction for rectifying the difference between said first and second voltages for providing the sole source for a predetermined polarity and magnitude of average current flow through said deflection winding during said deflection cycle.

2. A deflection system including a centering circuit according to claim 1 wherein the peak-to-peak amplitude of a first signal developed at said first junction relative to said second junction is less than the peak-to-peak amplitude of a second signal developed across said deflection winding.

3. A deflection system including a centering circuit according to claim 2 wherein said centering means includes a reactive means for shifting the phase of current between said first junction and said second junction relative to said first signal.

4. A deflection system including a centering circuit according to claim 3 wherein said centering means further includes a variable impedance to control the magnitude of said average current flow.

5. A deflection system including a centering circuit according to claim 4 wherein said centering means includes a first and second unilateral conducting means coupled to opposite terminals of said variable impedance to provide for control of the polarity of said average current flow between said first junction and said second junction.

6. A deflection system including a centering circuit according to claim 5 wherein said transformer winding is coupled to said first and said second capacitors to increase the amplitude of said first signal during said first time interval.

* * * * *